United States Patent [19]

Morimoto et al.

[11] Patent Number: 5,523,866
[45] Date of Patent: Jun. 4, 1996

[54] LIQUID-CRYSTAL DISPLAY DEVICE HAVING SLITS FORMED BETWEEN TERMINALS OR ALONG CONDUCTORS TO REMOVE SHORT CIRCUITS

[75] Inventors: Mitsutaka Morimoto; Takahiko Watanabe, both of Tokyo, Japan

[73] Assignee: NEC Corporation, Tokyo, Japan

[21] Appl. No.: 70,945

[22] Filed: Jun. 4, 1993

[30] Foreign Application Priority Data

Jun. 4, 1992 [JP] Japan .................... 4-143872

[51] Int. Cl.⁶ .................... G02F 1/136; G02F 1/1345; G02F 1/13; H01L 21/465
[52] U.S. Cl. .................... 359/59; 359/88; 257/59; 257/72; 437/228
[58] Field of Search .................... 257/59, 72, 210; 359/88, 54, 59; 437/228, 48

[56] References Cited

U.S. PATENT DOCUMENTS

| | | | |
|---|---|---|---|
| 3,600,235 | 8/1971 | Okumura | 437/228 |
| 3,635,774 | 1/1972 | Ohta | 437/228 |
| 4,331,708 | 5/1982 | Hunter | 437/228 |
| 4,484,979 | 11/1984 | Stocker | 437/228 |
| 4,489,481 | 12/1984 | Jones | 437/228 |
| 4,651,185 | 3/1987 | Holmberg et al. | 257/59 |
| 4,821,092 | 4/1989 | Noguchi | 359/59 |
| 4,838,656 | 6/1989 | Stoddard | 359/54 |
| 5,040,875 | 8/1991 | Noguchi | 257/59 |
| 5,208,690 | 5/1993 | Hayashi et al. | 359/59 |

FOREIGN PATENT DOCUMENTS

| | | | |
|---|---|---|---|
| 3-46331 | 2/1991 | Japan . | |
| 2219136 | 11/1989 | United Kingdom | 359/59 |
| 2245741 | 1/1992 | United Kingdom | 359/59 |

OTHER PUBLICATIONS

"Thin Film Transistor for Gray Scale LCD", IBM Technical Disclosure Bulletin, vol. 33, No. 1A, Jun. 1990, pp. 481–482.

*Primary Examiner*—Anita Pellman Gross
*Assistant Examiner*—Walter Malinowski
*Attorney, Agent, or Firm*—Sughrue, Mion, Zinn, Macpeak & Seas

[57] ABSTRACT

Disclosed herein is an active matrix array substrate for a liquid-crystal display device including a plurality of gate and drain buses, a plurality of gate and drain terminals respectively connected to the gate and drain buses, and a plurality of slits each formed between the adjacent ones of the gate terminals and of the drain terminals to cut undesirable conductive-portions which short-circuit the adjacent two terminals.

12 Claims, 10 Drawing Sheets

LIQUID-CRYSTAL DISPLAY DEVICE HAVING SLITS FORMED BETWEEN TERMINALS OR ALONG CONDUCTORS TO REMOVE SHORT CIRCUITS

BACKGROUND OF THE INVENTION

The present invention relates to a liquid-crystal display device and, more particularly, to an active matrix array substrate having thereon a plurality of switching elements arranged in a matrix and a plurality of wirings connecting the elements.

An active matrix liquid-crystal panel having a switching element array formed on a large-size substrate made of a glass is put into practical use, and thus as a thin, light-weight display device, may replace conventional CRTs. The active matrix-array plate having thereon a plurality of active switching elements arranged as a matrix and a plurality of wiring connecting them to one another is fabricated by repeating the depositing and patterning of a semiconductor layer, an insulating film and a conductive film on the substrate.

Thin-film transistors (TFTs) are used as active switching elements and arranged in a matrix consisting of rows and columns. The TFTs arranged in the same row have respective gates connected in common to a gate wiring which is in turn connected to gate terminal receiving a gate drive signal. On the other hand, the drains of the TFTs arranged in the same column are connected in common to a drain wiring which is in turn connected to a drain terminal receiving drain drive signals. The source of each of the TFTs is connected to a transparent electrode constituting a pixel.

The gate wirings are arranged in rows with a predetermined pitch according to the size of each pixel, and the drain wirings are arranged in columns similarly. On the other hand, in view of the connection to a driving IC for applying the respective drive signals to the gate and drain terminals, the gate and drain terminals are arranged with a pitch that is considerably smaller than the pitch of the gate or drain wirings.

The gate and drain wirings and the gate and drain terminals are formed by forming a conductive film on a glass plate and then selective removing the conductive film by means of the so-called photoresist process. In the photoresist process, however, if dust contamination occurs, a portion or portions of the conductive film would undesirably remain, although such portions should have been removed. The portions of the conductive film thus left are so small that no substantial short-circuit occurs between the gate wirings or the drain wiring in the matrix array. As described above, however, the pitches between gate terminals and between drain terminals are so small as to allow such portions of the conductive film to produce short-circuits between these terminals. There is further a tendency to produce short-circuits between adjacent ones of partial wirings for connecting the respective terminals to the gate and drain wirings.

SUMMARY OF THE INVENTION

It is therefore an object of the present invention to provide a liquid-crystal display free from short-circuits between terminals and/or partial wirings.

Another object of the present invention is to provide a process of manufacturing the liquid-crystal display free from short-circuits between terminals and/or partial wirings without adding any step to a string of manufacturing steps.

A liquid-crystal display according to one aspect of the present invention comprises, on an insulating substrate, a plurality of first (gate) wirings arranged with a first pitch in a plurality of rows, a plurality of second (drain) wirings arranged with a second pitch in a plurality of columns, TFTs disposed at the respective intersections of the first and second wirings, a plurality of terminals arranged with a smaller pitch than the first and second pitches in line in a column direction, a plurality of partial wirings connecting the terminals to the first wirings, respectively, a first insulating layer covering the first wirings, a part of each of the plurality of terminals and the partial wirings, and a plurality of slits selectively formed in the first insulating film between adjacent ones of the terminals and between adjacent ones of the partial wirings, each of the slits reaching the substrate.

According to another aspect of the present invention, after forming first wirings, terminals and partial wirings, on an insulating plate, an insulating film is formed over the entire surface, and the insulating film is selectively removed to expose respective parts of the terminals and simultaneously to form slits between adjacent terminals and between adjacent partial wirings, followed by selective-etching to form second wiring. The slits are subjected to an etchant in the selective-etching for forming the second wirings.

Thus, the undesired conductive portion forming a short-circuit between adjacent terminals, between adjacent partial wirings, and/or between the terminal and the partial wiring is cut or broken by the slit.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE INVENTION

Figure 1:
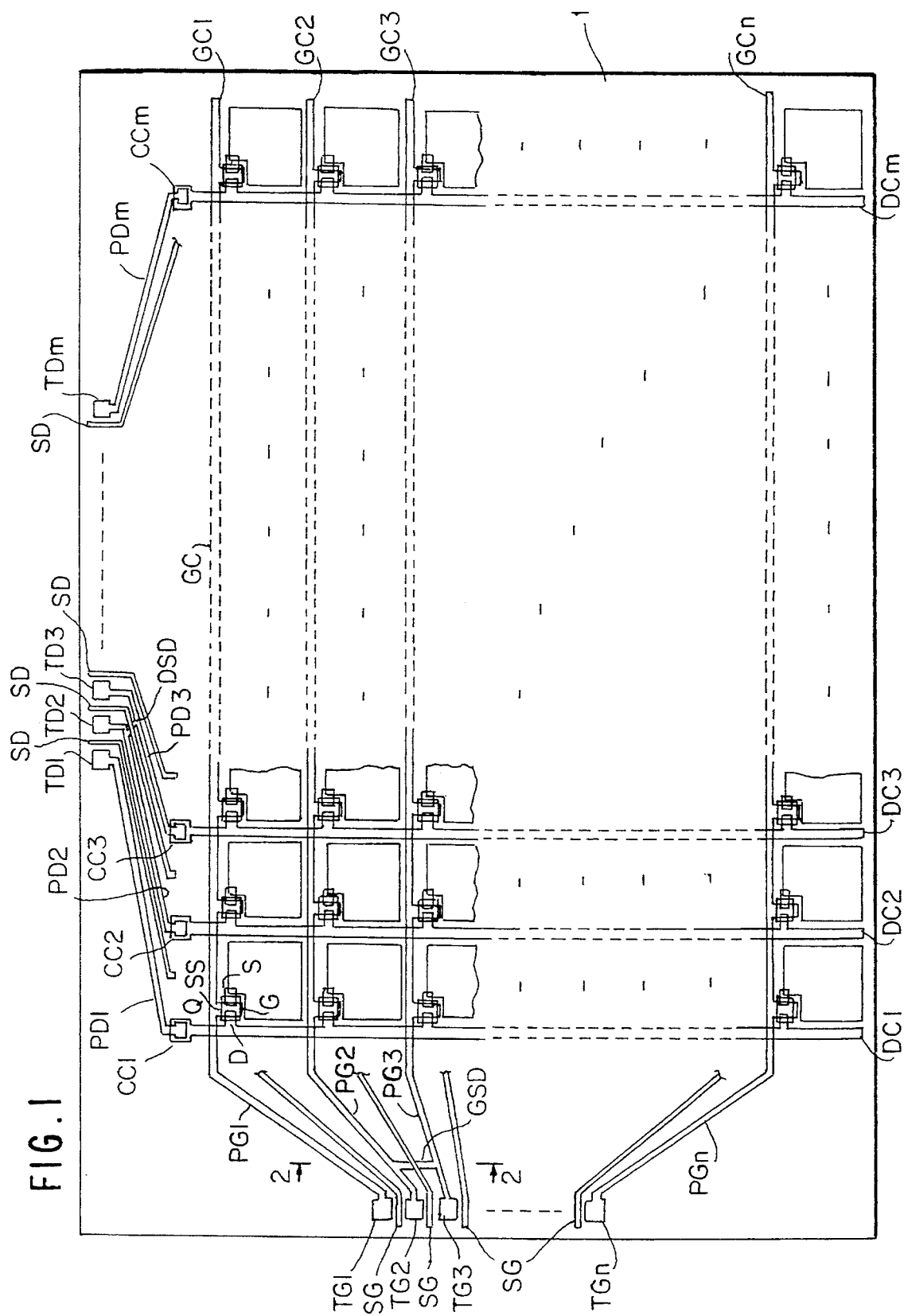
FIG. 1 is a plan view of an active matrix array substrate illustrative of an embodiment of the present invention.

Referring to FIG. 1, there is shown an active matrix array substrate for a liquid-crystal display according to an embodiment of the present invention, this substrate indicating a state immediately before the so-called oriented film is formed.

Formed on a glass plate 1 is an array of TFTs Q which are arranged in a matrix of N rows and M columns. Each TFT Q is constructed of a gate G, a semiconductor layer SS formed above gate G with a gate insulating film (not shown) sandwiched between them, a drain D and a source S formed at each edge of semiconductor layer SS. Each source S is connected to a transparent electrode PS which together with another electrode (not shown), constitutes a pixel. The semiconductor layer SS is made of amorphous silicon.

The gates G of TFTs Q arrange in the same row are connected in common to a gate wiring or bus GC. There are provided N gate wirings or buses GC1 to GCn arranged in rows which a predetermined pitch, accordingly. Likewise, to drains D of TFTs Q arranged in the same column are connected in common to a drain wiring or bus DC. There are thus provided M drain wirings or buses DC1 to DCn arranged in columns with a specified pitch. These pitches depend on the size of the pixel, i.e. the transparent electrode PS.

The gate buses GC are connected through partial wirings GC to gate terminals TG, respectively. As shown, gate terminals TG1 to TGn are arranged in line in column with a very small pitch because an IC (not shown) supplying gate drive signals to gate terminals TG is connected in general by means of carrier tape. Similarly, the drain buses DC are connected respectively through partial wirings PD to drain terminals TD1 to TDn which are arranged in line in row also with a very small pitch. In this embodiment, although described later in detail, the drain terminals TD and the partial wirings PD are formed simultaneously with the gate terminals TG and the partial wirings PG and before forming the drain buses DC, and hence the drain buses DC are connected at contacts CC to the corresponding one of drain-bus connections PD, respectively.

This matrix substrate further includes, in accordance with the present invention, a plurality of slits SG each formed between adjacent gate terminals TG and between adjacent partial wirings PG and slits SD each formed between adjacent drain terminals TD and between adjacent partial wirings PD. With these slits SG and SD, short-circuit conductive-portions indicated as GSD and DSD are cut or broken. Thus, an electrical isolation is carried out and secured between the gate wirings in different rows and between the drain wirings in different columns.

Figure 2:
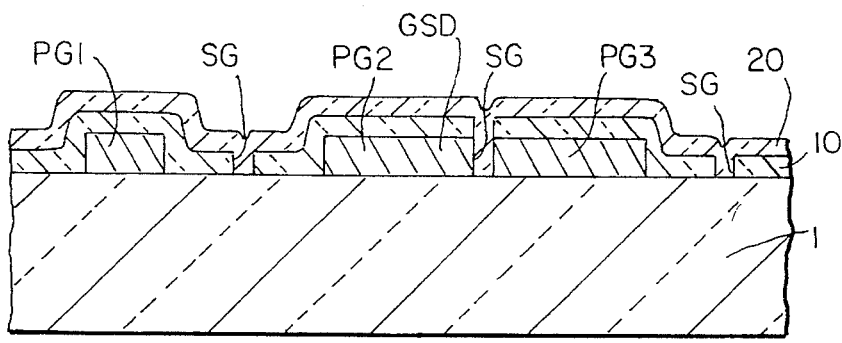
FIG. 2 is a cross-sectional view taken along line A—A' of FIG. 1.
Figure 6:
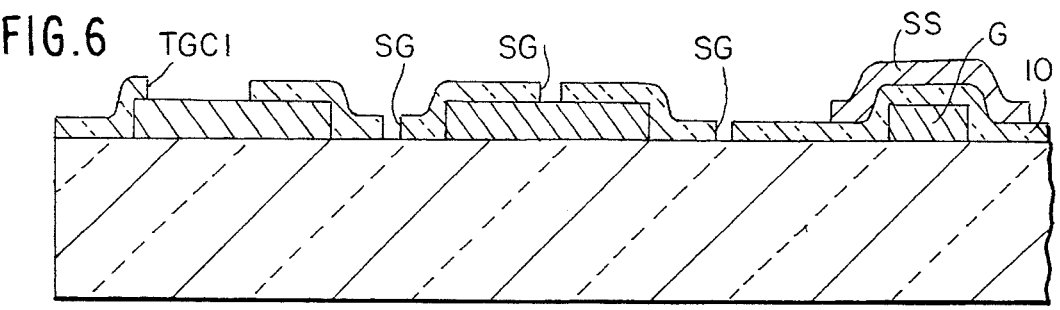
FIG. 6 is a cross-sectional view taken along line B—B' of FIG. 5.

Turning to FIG. 2 which is a cross-sectional view along line A–A' of FIG. 1, the partial wirings PG are selectively formed on the glass substrate 1. This selective formation is performed by forming a conductive film over the entire surface of the substrate 1, followed by patterning using a photoresist. At this time, since the contamination caused by dust that happens to be contained during the photoresist process, the short-circuit-conductive-portion GSD is formed between the partial wirings PG2 and PG3. A gate insulating film 10 is thereafter formed to cover the terminals TG and TD, partial wirings PG and PD and the gate buses GC and then subjected to the selective etching to make holes through which parts of terminals TG, TD are exposed. Utilizing this selective etching, the slits SG are simultaneously formed, through which parts of the short-circuit-conductive portions SG and DSD are exposed. Each of the slits GSD and SD reaches the substrate 1 if there is no short-circuit-conductive portion thereunder. Subsequently, the drain buses DC are formed by selectively removing another conductive layer which has been formed over the entire layer. By this selective-etching, the conductive-portion GSD and DSD are cut because an etchant for the conductive layer also etches them. An insulating film 20 is formed as passivation film to fill slits SG and SD. an oriented film (not shown) is then formed.

Next, description will be made below on a method for obtaining the above active matrix array with reference to FIGS. 3 to 10 each showing a part of the substrate of FIG. 1.

Figure 3:
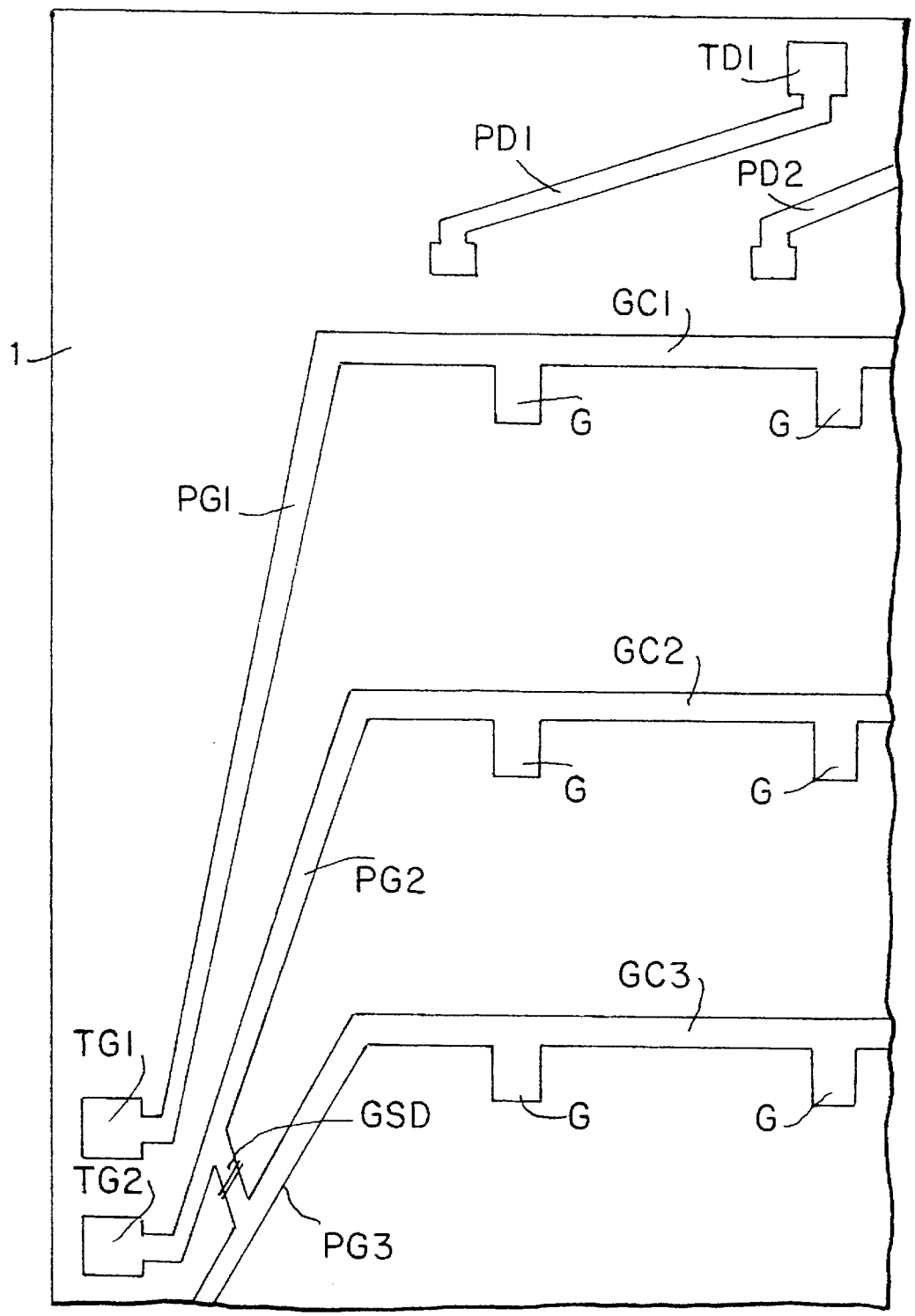
FIG. 3 is a plan view for illustrating a processing step according to an embodiment of the present invention.

As shown in FIG. 3, on the glass plate 1 conductive thin conductive film of chromium (Cr) is formed and patterned by the selective-etching to form the gate buses GC, the gate terminals TG, the partial wirings PG, the drain terminals TD, the partial wirings PD and the contacts areas CC. Each of the gate buses GC has projections each constituting the gate G of the TFT. As described hereinbefore, by the defect in patterning process, the short-circuit-conductive-portion GSD is formed to short-circuit the partial wirings PG2 and PG3.

Figure 4:
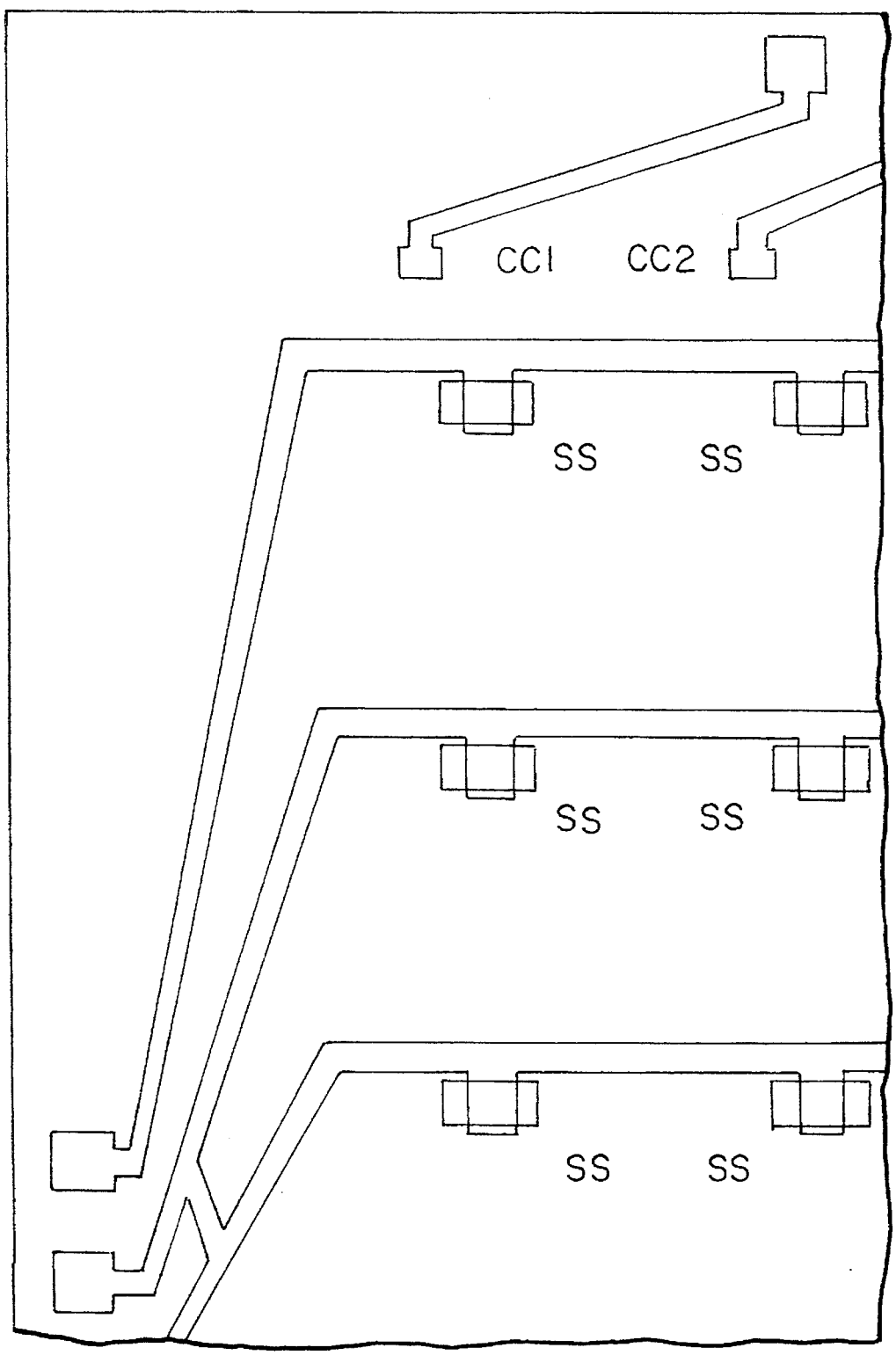
FIG. 4 is a plan view for illustrating another processing step of the embodiment.

Referring to FIG. 4, after forming the gate insulating film (not shown in this drawing) over the entire surface, an amorphous silicon (a-Si) film is formed over the entire surface of the gate insulating film and then patterned to form a-Si films S of the TFTs.

Figure 5:
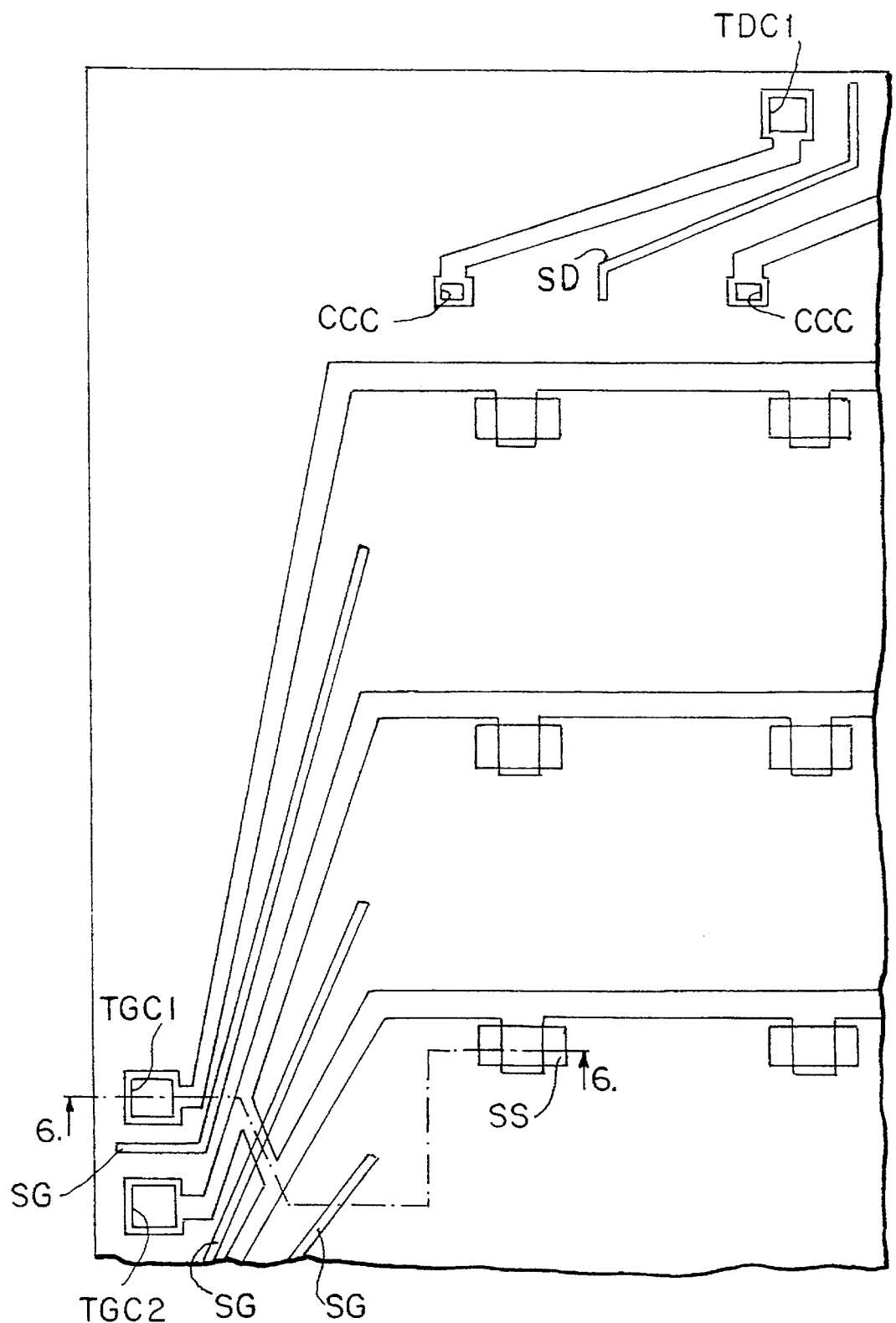
FIG. 5 is a plan view for illustrating a further processing step of the embodiment.

Thereafter, as shown in FIG. 5, the gate insulating film is selectively etched to make contact holes TGC for the gate terminals TG, contact holes TDC for the drain terminals TD and contact holes CCC for the contact terminals CC as well as the slits SG and SD. The slit SG thus exposes a part of the conductive portion GSD and a part of the glass plate 1, as apparent from FIG. 6 which is a cross-sectional view along long B–B' of FIG. 5.

Figure 8:
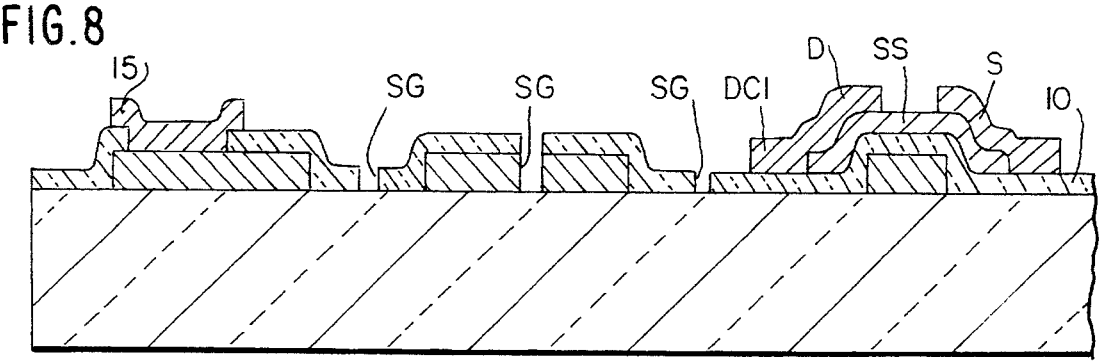
FIG. 8 is a cross-sectional view taken along line C—C' of FIG. 7.
Figure 10:
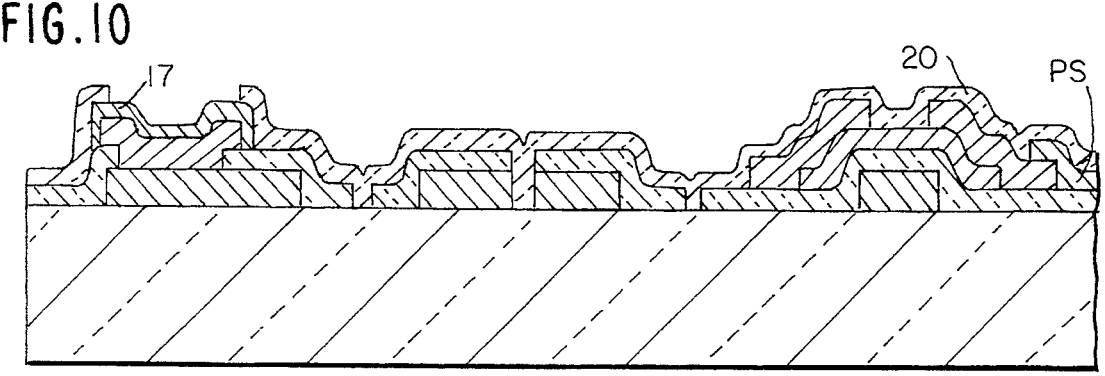
FIG. 10 is a cross-sectional view taken along line D—D' of FIG. 9.
Figure 7:
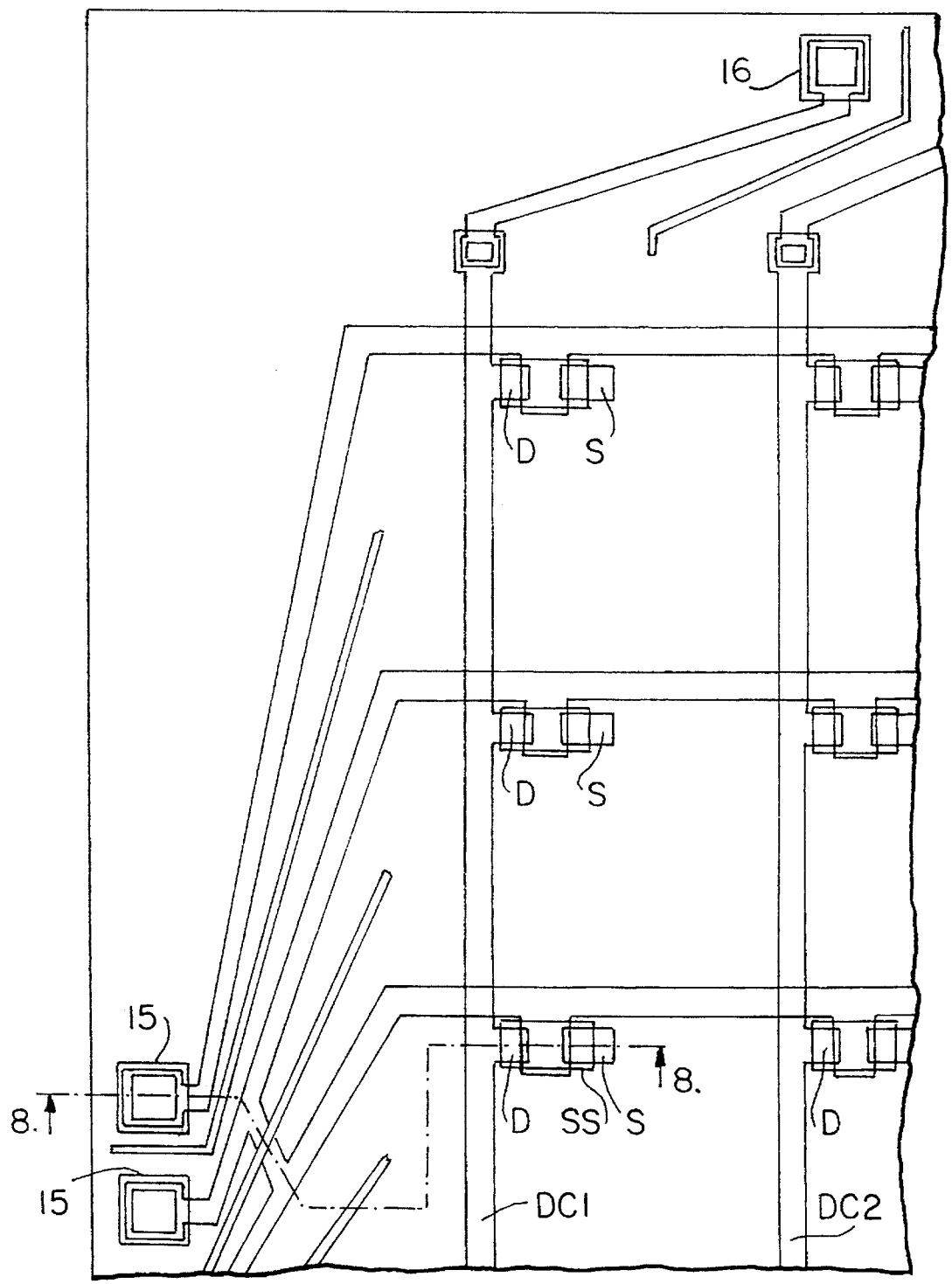
FIG. 7 is a plan view for illustrating a still further processing step of the embodiment.

Subsequently, a Cr conductive film is formed over the entire surface and then patterned to form the drain wirings DC and electrode conductive layers 15 and 16 which is in contact with the terminals TG and TD through the contact holes TGC and TDC, as shown in FIG. 7. The drain buses DC are connected through the contact holes CCC to the contact terminals CC, respectively. Each of the drain buses DC has projections each connected to one end of the a-Si film S as a drain D of a TFT. Further, the sources S of the TFTs are simultaneously formed, each of which is connected to the other end of the a-Si film S. By this selective etch, the conductive-portion GSD exposed through the slit SG is cut, as shown in FIG. 8 which is a cross-sectional view along line C–C' of FIG. 7.

Figure 9:
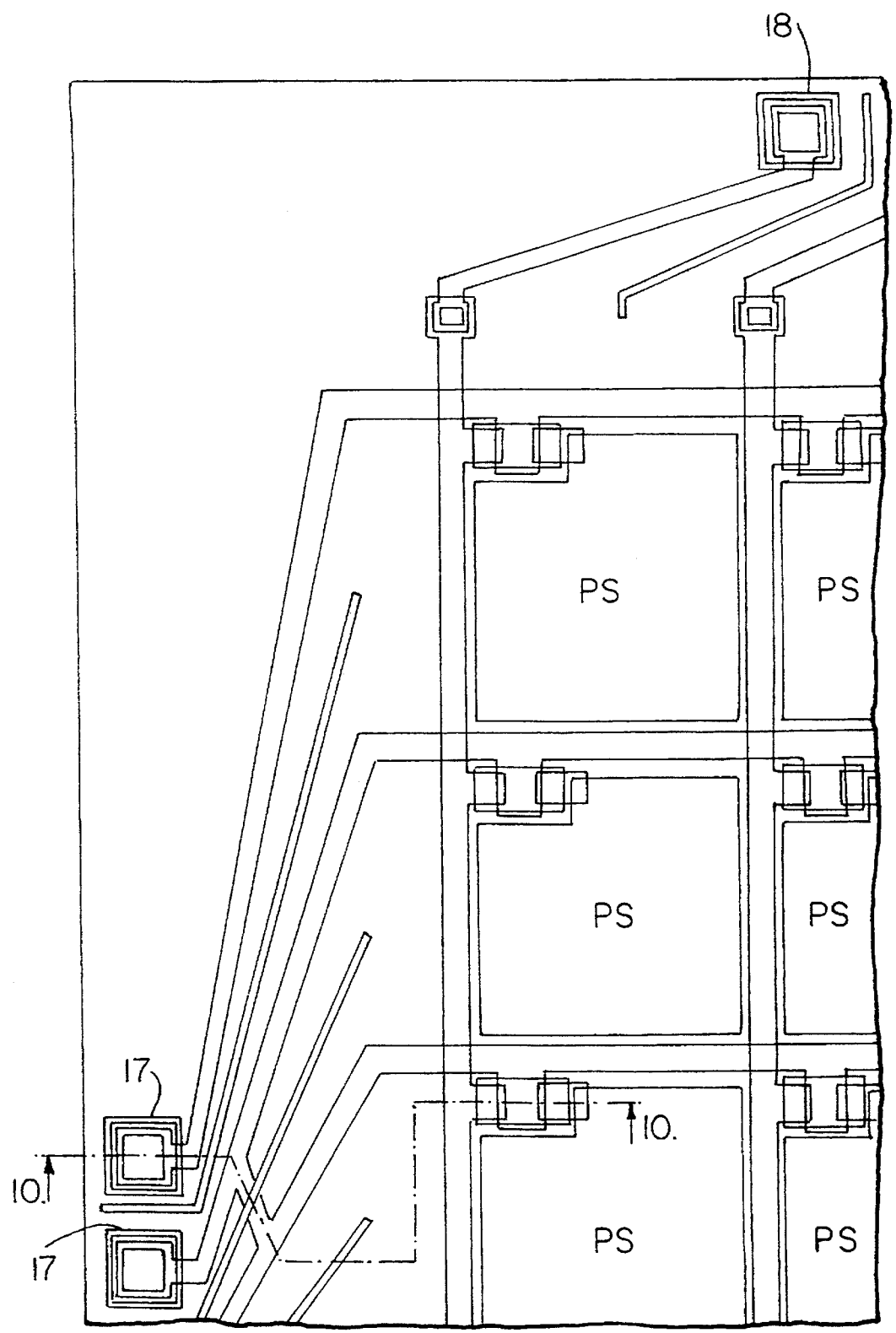
FIG. 9 is a plan view for illustrating a still further processing step of the embodiment.
Figure 11:
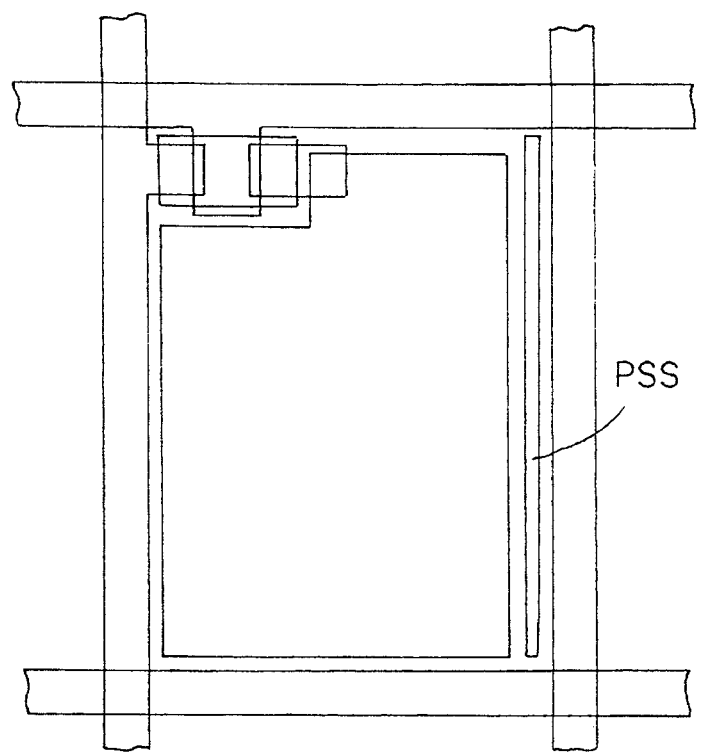
FIG. 11 is a plan view for illustrating an alternative example of one TFT area on the active matrix array plate according to the present invention.
Figure 12:
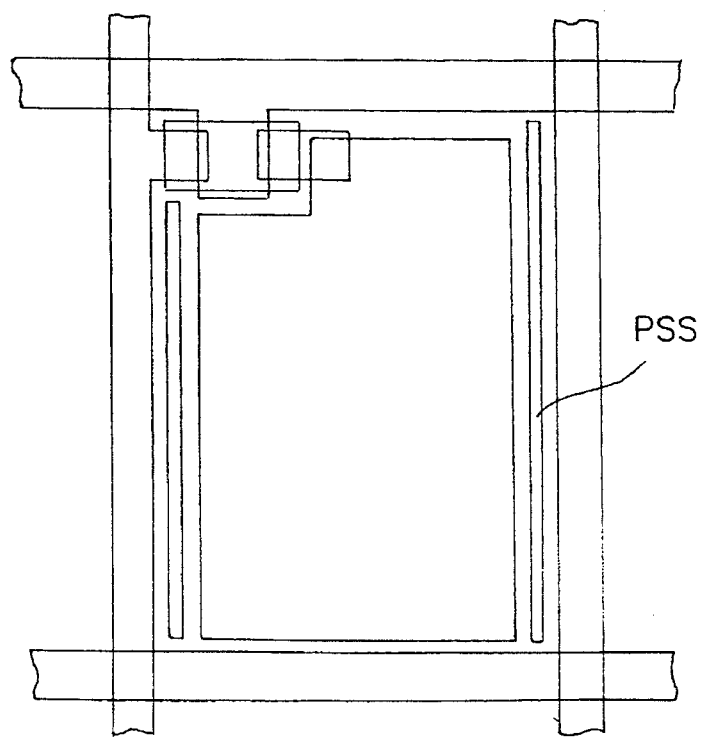
FIG. 12 is a plan view for illustrating another alternative example of one TFT area.
Figure 13:
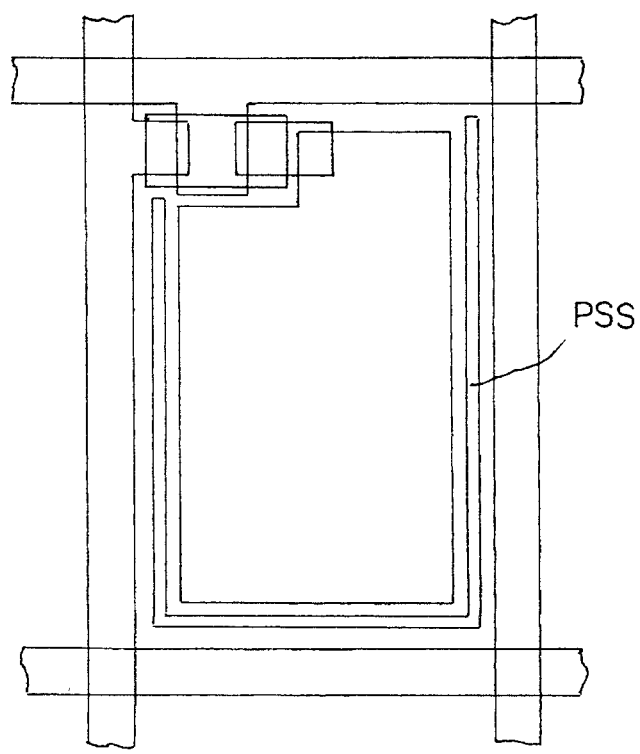
FIG. 13 is a plan view for illustrating a further alternative example of one TFT area.
Figure 14:
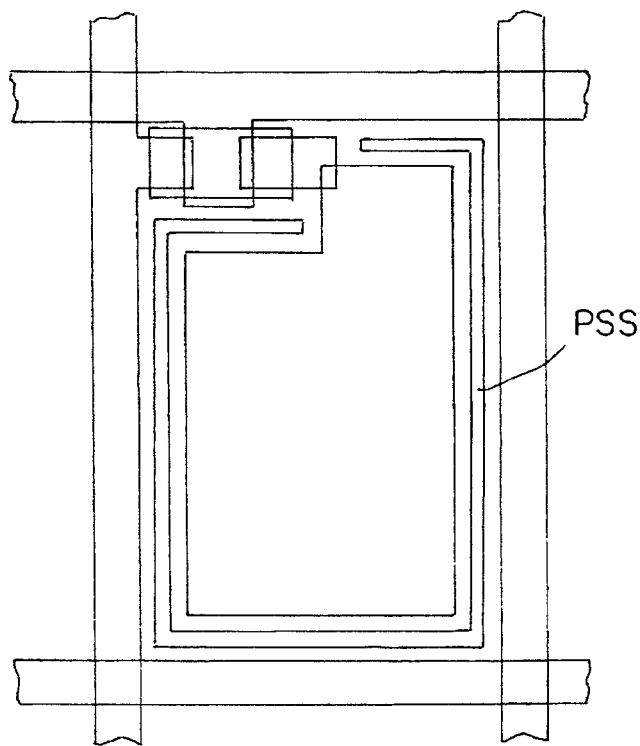
FIG. 14 is a plan view for illustrating a still further alternative example of one TFT area.

Subsequently, a transparent conductive film is formed over the entire surface, followed by the selective-etching to form one electrode PS of each pixel connected to the source S. Simultaneously, transparent conductive layers 17 and 18 are formed in contact with the electrode conductive layers 15 and 16, as shown in FIG. 9. A passivation film 20 is thereafter formed over the whole surface, and contact holes for terminals are then opened (See FIG. 10 which is a cross-sectional view along line D–D' of FIG. 9).

Subsequently, an oriented film (not shown) is screen-printed only on the matrix array, subjected to the so-called treatment, and is laid on so as to oppose the other plate on which a common electrode is formed. Then the liquid crystal is sealed to produce a liquid crystal display device.

The process according to the present invention described above permits the cutting of conductive-film shorts in a processing step needed to fabricate the active matrix plate. Thus, an additional processing step is not required.

As described above, in the TFT matrix array area, connections may be arranged at so large a pitch that slit cutting is unnecessary. On the other hand, the more the number of pixels, the smaller the pitch becomes, and hence it shorts may be produced in the matrix array area as well.

As illustrated in FIG. 10 through FIG. 14, therefore, slit or slits PSS may be provided along a side or sides of the transparent electrode S of each TFT or pixel. The slits PSS together with slits SG, SD are formed in the same processing step.

Figure 15:
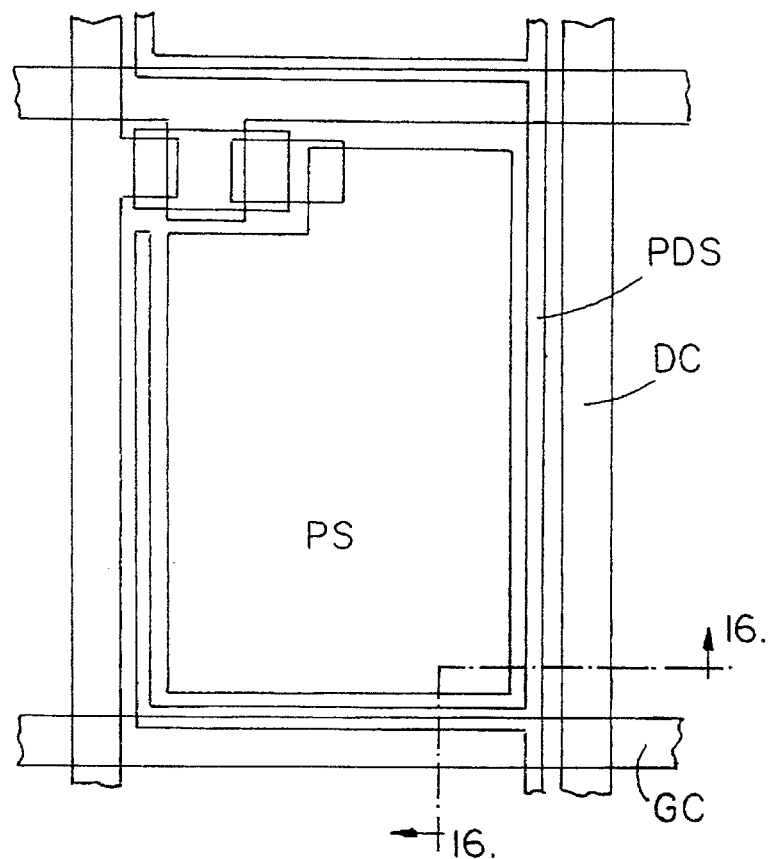
FIG. 15 is a plan view for illustrating a still further alternative example of one TFT area.

The slits PSS can cut the shorts between gate-bus connections GC but cannot cut the shorts between drain-bus connections DC. As shown in FIG. 15, therefore, slits PDS for cutting drain-bus connections are cut every TFT.

Figure 16:
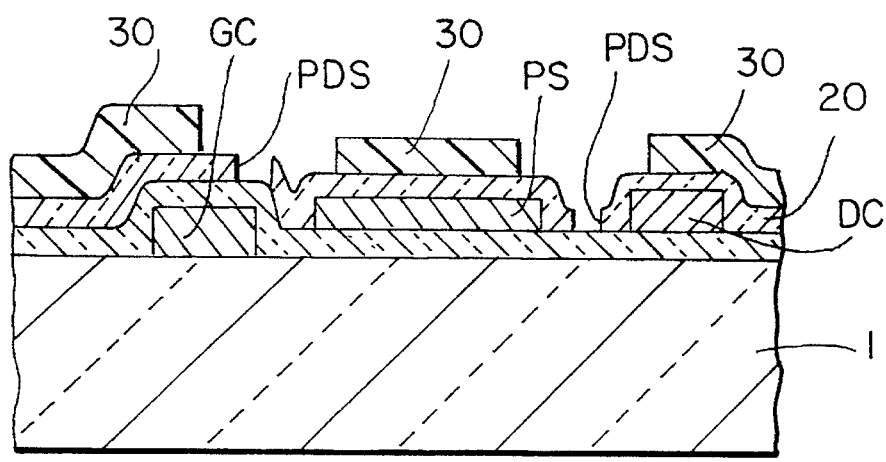
FIG. 16 is a cross-sectional view taken along line E–E' of FIG. 15.

AS shown in FIG. 16 which is a cross-sectional view along line E–E' of FIG. 15, slits PDS are formed at the same time in the process step (FIG. 10) of selectively etching a passivation film 20. Further, the process proceeds as follows: A photoresist film 30 is formed over the entire surface, holes are opened along slits PDS, and etching using an etchant for Cr is applied to cut shorts between drain-bus connections DC. FIGS. 11 through 14 and FIG. 15 can be applied to each TFT.

As described above, according to the invention, conductive-film shorts, even if left due to defective patterning, the conductive film are cut, and thus an active matrix array plate which secures insulation between buses and between connections on it is provided. Further a process of manufacturing the same plate is provided which permits the insulation without any extra processing step.

What is claimed is:

1. A liquid-crystal display device comprising, on an insulating substrate, a plurality of first wirings arranged in a plurality of rows in a first pitch, a plurality of second wirings arranged in a plurality of columns in a second pitch, a plurality of thin-film transistors each disposed at a different intersection of said first and second wirings, a plurality of terminals arranged in line in a column direction in a third pitch that is smaller than said first pitch, a plurality of partial wirings each connecting a corresponding one of said terminals to a corresponding one of said first wirings, a first insulating film covering said first wirings, a part of each of said terminals and said partial wirings, and a plurality of slits each formed in said first insulating film between adjacent ones of said terminals and between adjacent ones of said partial wirings, each of said slits reaching said insulating substrate.

2. The device as claimed in claim 1, wherein each of said thin-film transistors has a transparent conductive layer connected to an electrode thereof and said device further comprises a plurality of additional slits each formed in said first insulating film along at least one side of said transparent conductive layer of each of said thin-film transistors, each of said additional slits reaching said insulating substrate.

3. The device as claimed in claim 1, wherein each of said thin-film transistors has a transparent conductive layer connected to an electrode thereof, said device further comprising a second insulating film covering said first insulating film and said second wirings and a plurality of additional slits formed in said second insulating film along at least one side of said transparent conductive layer of each of said thin-film transistors, each of said additional transistors reaching said first insulating film.

4. A liquid-crystal display device comprising, on an insulating substrate, a plurality of first wirings arranged in a plurality of rows in a first pitch, a plurality of second wirings arranged in a plurality of columns in a second pitch, a plurality of thin-film transistors each disposed at a different intersection of said first and second wirings, a plurality of first terminals arranged in line in a column direction in a third pitch that is smaller than said first pitch, a plurality of first partials wirings each connecting a corresponding one of said first terminals to a corresponding one of said first wirings, a plurality of second terminals arranged in line in a row direction in a fourth pitch that is smaller than said second pitch, a plurality of second partial wirings each extending from a corresponding one of said second terminals, a first insulating film covering said first wirings, said first and second partial wirings and a part of each of said first terminals and said second terminals, a second insulating film formed on said first insulating film to cover said second wirings, a plurality of contact holes selectively formed in said first insulating film to connect said second partial wirings to said second wirings, respectively, a plurality of first slits each formed in said first insulating film between adjacent ones of said first terminals and between adjacent ones of said first partial wirings, and a plurality of second slits each formed in said first insulating film between adjacent ones of said second terminals and between adjacent ones of said second partial wirings, each of said first and second slits reaching said insulating substrate.

5. The device as claimed in claim 4, wherein said each of said first and second slits is filled with said second insulating film.

6. A method for manufacturing a liquid-crystal display device comprising the steps of:

forming a first conductive layer on an insulating substrate, followed by selectively removing said first conductive layer by use of an etchant to form a plurality of first wirings arranged in a plurality of rows, a plurality of terminals corresponding respectively to said first wirings and a plurality of partial wirings each connecting a corresponding one of said first wirings to a corresponding one of said terminals, forming an insulating film to cover said first wirings, said terminals and said partial wirings, selectively removing said insulating film to form a plurality of slits in said insulating film, each of said slits running between adjacent ones of said terminals and between adjacent ones of said partial wirings, and forming a second conductive layer, followed by selectively removing said second conductive layer by use of said etchant to form a plurality of second wirings arranged in a plurality of columns, a portion of said second conductive layer covering said slits being thereby removed therefrom and each of said slits being subjected to said etchant for removing said first and second conductive layers.

7. The method as claimed in claim 6, further comprising the step of, before forming said second conductive layer, selectively forming a plurality of semiconductor layers each overlapping a part of each of said first wirings with an intervention of said insulating film, each of said second wirings having a portion connected to one part of each of said semiconductor layers and a plurality of electrode layers each connected to another part of each of said semiconductor layers being formed by selecting removing said second conductive layer.

8. The method as claimed in claim 6, wherein a plurality of contact holes are further formed in said insulating film to respectively expose parts of said terminals by selectively removing said insulating film and a plurality of electrode conductors are further formed by selectively etching said second conducting layer in contact respectively with said terminals through said contact holes.

9. A method for manufacturing a liquid-crystal display device comprising the steps of:

forming a first conductive layer on an insulating substrate, followed by selectively removing said first conductive layer by use of an etchant to form a plurality of first wirings arranged in a plurality of rows, a plurality of first terminals corresponding respectively to said first wirings, a plurality of first partial wirings each connecting a corresponding one of said first wirings to a corresponding one of said first terminals, a plurality of second terminals and a plurality of second partial wirings each extending from a corresponding one of said second terminals, forming a first insulating film to cover said first wirings, said first and second terminals and said first and second partial wirings, selectively removing said first insulating film to form a plurality of contact holes each exposing therethrough a part of a corresponding one of said second partial wirings, a plurality of first slits each running between adjacent ones of said first terminals and between adjacent ones of said first partial wirings and plurality of second slits each running between adjacent ones of said second terminals and between adjacent ones of said second partial wirings, forming a second conductive layer on said first insulating film, followed by selectively removing said second conductive layer by use of said etchant to form a plurality of second wirings arranged in a plurality of columns, each of said second wirings being connected through a corresponding one of said contact holes to a corresponding one of said second partial wirings, a part of said second conductive layer covering said first and second slits being thereby removed therefrom and each of said first and second slits being subjected to said etchant for removing said first and second conductive layers, and forming a second insulating film to cover said second wirings and fill said first and second slits.

10. The method as claimed in claim 9, further comprising the step of, before selectively etching said first insulating film, selectively forming a plurality of semiconductor layers each overlapping a part of each of said first wirings with an intervention of said first insulating film, each of said second wirings having a part connected to a correspond one of said semiconductor layers, and a plurality of electrode layers being formed by selectively etching said second conducting layer in contact respectively with semiconductor layers separately from said part of each of said second wirings, and said method further comprising the step of forming a plurality of transparent electrode layers connected respectively to said electrode layers before forming said second insulating film.

11. The method as claimed in claim 10, wherein a plurality of third slits are further formed to each run along at least one side of each of said transparent electrode layers by selectively etching said first insulating film.

12. The method as claimed in claim 10, further comprising a step of selectively removing said second insulating film to form a plurality of additional slits each running along at least one side of each of said transparent electrode layers.

* * * * *